United States Patent [19]

Strosser et al.

[11] Patent Number: 4,748,802
[45] Date of Patent: Jun. 7, 1988

[54] APPARATUS AND METHOD FOR MONITORING BALE SHAPE IN ROUND BALERS

[75] Inventors: Richard P. Strosser, Akron; James D. Walker, Lancaster, both of Pa.

[73] Assignee: New Holland Inc., New Holland, Pa.

[21] Appl. No.: 46,614

[22] Filed: May 7, 1987

[51] Int. Cl.⁴ .............................................. A01I 39/00
[52] U.S. Cl. ................... 56/341; 56/DIG. 15; 100/88
[58] Field of Search ............... 56/10.2, 341, DIG. 15; 100/88

[56] References Cited

U.S. PATENT DOCUMENTS

| | | | |
|---|---|---|---|
| 3,222,851 | 12/1965 | Schnaidt et al. | 56/DIG. 15 |
| 4,065,914 | 1/1978 | Phillips et al. | 56/341 |
| 4,224,867 | 9/1980 | Gaeddert et al. | 56/341 |
| 4,426,833 | 1/1984 | Campbell | 56/341 |
| 4,433,533 | 2/1984 | Giani | 56/341 |
| 4,517,795 | 5/1985 | Meiers | 56/341 |
| 4,656,931 | 4/1987 | Van Dan Bossche et al. | 56/341 |
| 4,674,403 | 6/1987 | Bryant et al. | 56/341 |
| 4,686,820 | 8/1987 | Andra et al. | 100/88 |
| 4,698,955 | 10/1987 | Wagstaff | 56/341 |
| 4,702,066 | 10/1987 | Newendorp | 56/341 |

Primary Examiner—Paul J. Hirsch
Attorney, Agent, or Firm—Darrell F. Marquette; Frank A. Seemar; Larry W. Miller

[57] ABSTRACT

Bale shape monitoring apparatus for use in combination with a round baler having an expandable bale forming chamber. The apparatus alternately illuminates first and second indicator lights in response to predetermined expansion of the bale forming chamber. The apparatus includes first and second electrical switches arranged in quadrature and connected to the first and second indicator lights by a microcomputer, and a plurality of cam lobes formed on the outer periphery of a ring for activating the switches. A method for monitoring bale shape in a round baler utilizes the first and second indicator lights and the first and second electrical switches. According to this method, the first indicator light is illuminated by opening the first and second switches and by closing the first and second switches. The second indicator light is illuminated by closing the first switch while the second switch remains open and by opening the first switch while the second switch remain closed.

10 Claims, 4 Drawing Sheets

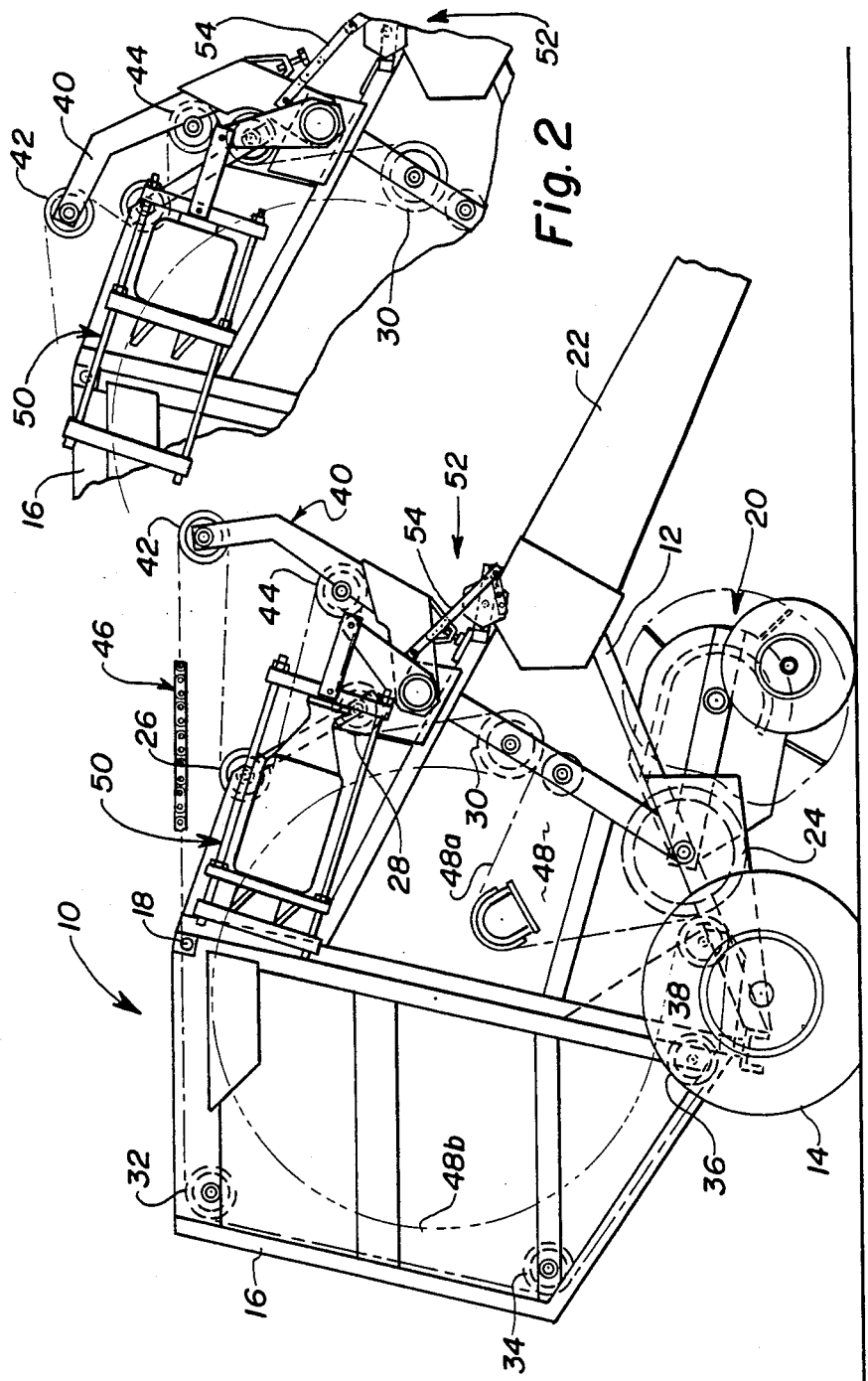

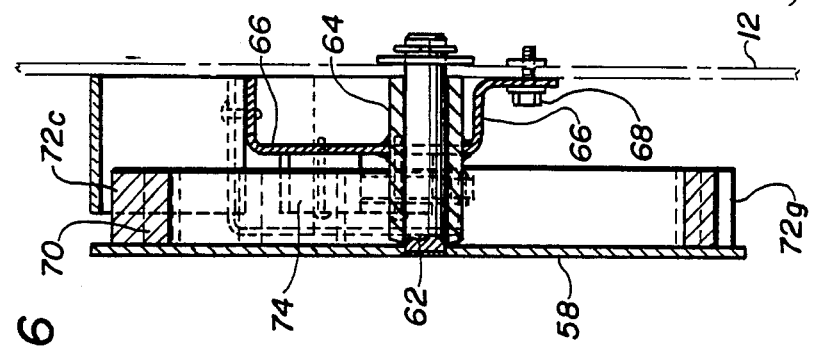
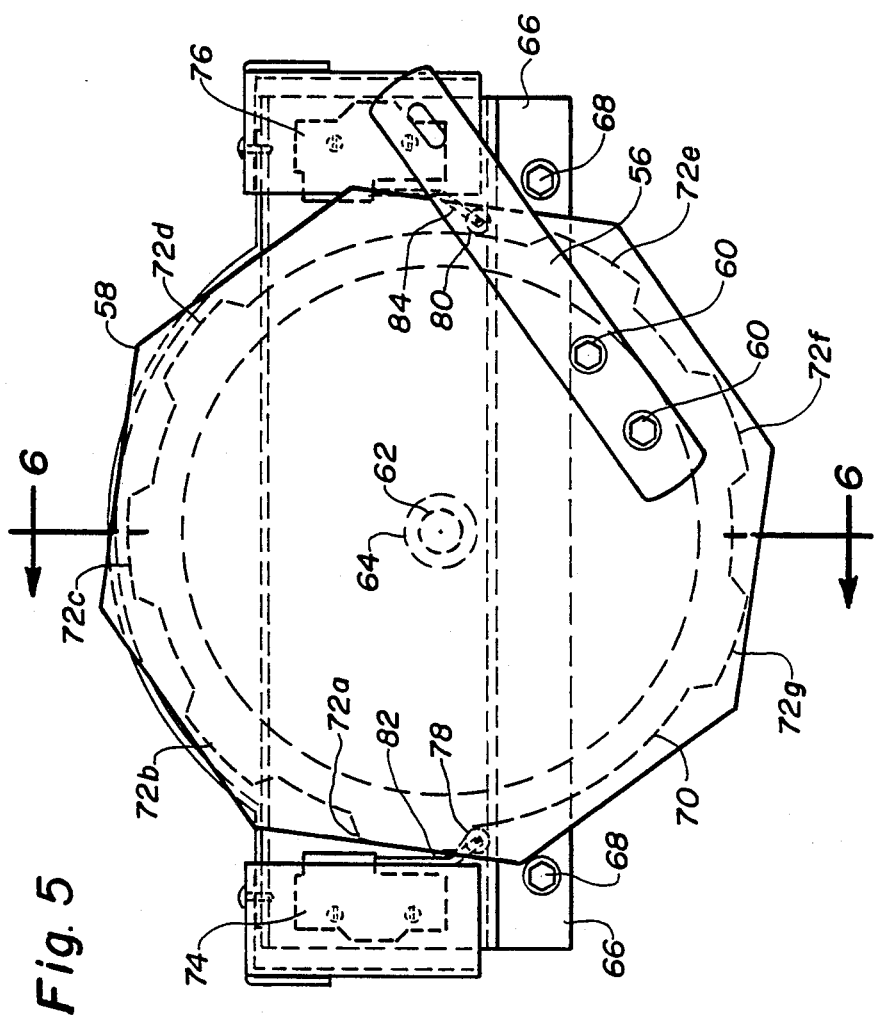

APPARATUS AND METHOD FOR MONITORING BALE SHAPE IN ROUND BALERS

BACKGROUND OF THE INVENTION

This invention relates generally to round balers and, in particular, to apparatus and a method for monitoring bale shape in round balers.

During operation of a round baler, it is often necessary to weave the round baler back and forth in a zigzag pattern on the windrow of crop material being picked up and baled. This is because the windrows of crop material are typically much narrower in width than the pickups and the baling chambers of round balers. Without the weaving action, there is a tendency for the bales formed in round balers to be barrel-shaped or egg-shaped instead of uniformly cylindrical. Although the proper weaving of a round baler in a zigzag pattern overcomes the problem of poorly shaped bales, it requires that the operator constantly remember when to weave the baler. This causes operator fatigue and results in poorly shaped bales due to operator error.

It is an object of the present invention to provide bale shape monitoring apparatus and a method for monitoring bale shape which prevent the formation of poorly shaped bales while reducing operator fatigue.

SUMMARY OF THE INVENTION

Bale shape monitoring means according to the present invention is intended for use in a round baler having an expandable bale forming chamber. First and second indicator means are provided and the bale shape monitoring means generates a signal in the first indicator means in response to a predetermined expansion of the bale forming chamber. The bale shape monitoring means subsequently generates a signal in the second indicator means in response to a further predetermined expansion of the bale forming chamber. The bale shape monitoring means includes first and second switches preferably arranged in quadrature and connected to the first and second indicator means, and single cam means for selectively activating the switches in order to alternately generate the signals in the indicator means.

In the preferred embodiment of the bale shape monitoring means, the cam means is connected to an arm means which supports the bale forming apron and which is movable as the bale forming chamber expands. The bale shape monitoring means generates the signals in the indicator means in response to predetermined movements of the arm means. The bale shape monitoring means includes a linkage connected at one end to the arm means and at the other end to a plate. The plate is rotatably mounted and carries a plurality of cam lobes. The switches are disposed for activation by the cam lobes in order to generate the signals in the indicator means.

The present invention also provides a method for monitoring bale shape in a round baler by utilizing first and second switches connected to first and second indicator means. The method includes the steps of generating a signal in the first indicator means by opening the first and second switches, generating a signal in the second indicator means by closing the first switch while the second switch remains closed, generating a signal in the first indicator means by closing the first and second switches, and generating a signal in the second indicator means by opening the first switch while the second switch remains closed.

DESCRIPTION OF THE DRAWINGS

FIG. 1 is a right side elevation view of a round baler embodying bale shape monitoring apparatus according to the present invention;

FIG. 2 is an enlarged view of a portion of the round baler of FIG. 1 illustrating bale shape monitoring apparatus in accordance with the present invention;

FIG. 5 is a further enlarged view of the bale shape monitor monitoring apparatus illustrated in FIG. 3;

FIG. 6 is a sectional view taken along lines 6—6 in FIG. 5;

DESCRIPTION OF THE PREFERRED EMBODIMENT

Figure 3:
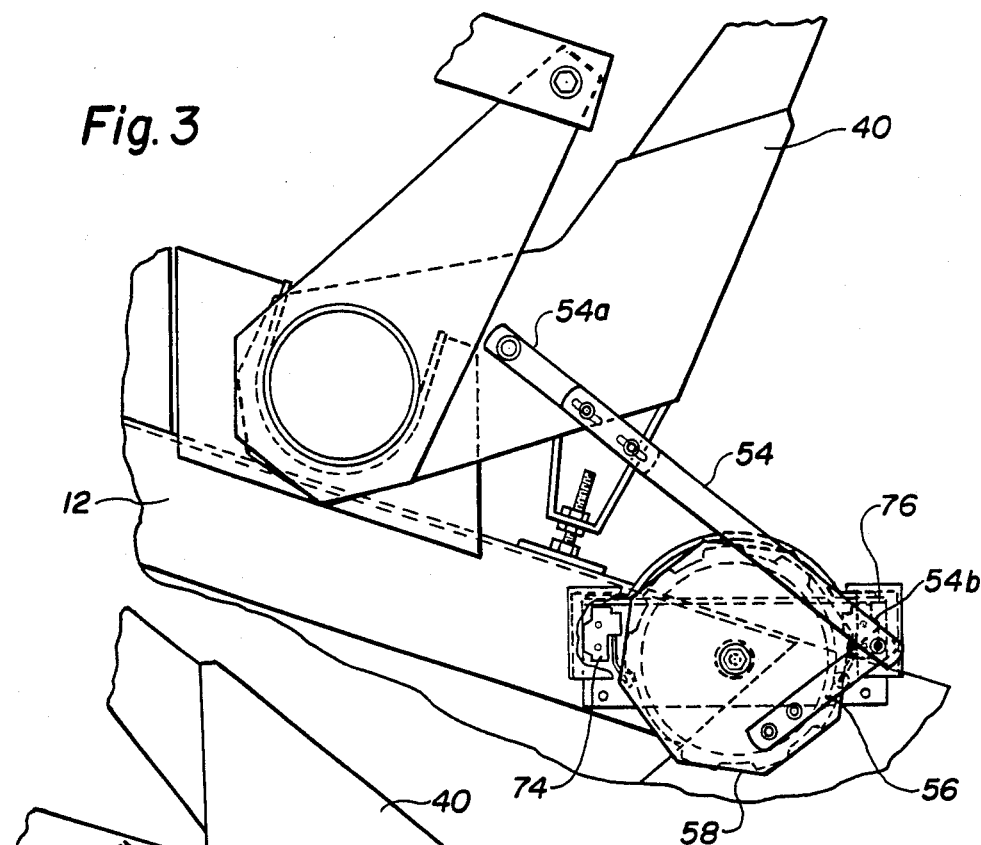
FIGS. 3 and 4 are further enlarged views of the bale shape monitoring apparatus illustrated in FIG. 2.

Referring to FIG. 1, a round baler 10 is generally of the type disclosed in U.S. Pat. No. 4,426,833, incorporated herein by reference. The round baler 10 includes a base frame 12 supported by a pair of wheels 14 and an auxiliary frame or tailgate 16 pivotally connected to the base frame 12 by stub shafts 18. A pickup mechanism 20 is mounted on the base frame 12 for picking up windrowed crop material, and a tongue 22 provided on the base frame 12 is adapted for connection to a tractor.

A floor roller 24 and guide members 26,28,30 are rotatably mounted on the base frame 12, and guide members 32,34,36,38 are rotatably mounted in the tailgate 16. An arm assembly 40 is rotatably mounted on the base frame 12 for rotational movement between a forward position shown in FIG. 1 and a rearward position shown in FIG. 2. The arm assembly 40 carries further rotatable guide members 42,44.

A flexible bale forming apron 46 is movably supported on the aforementioned guide members. The apron 46 may be of the chain and slat type as illustrated in FIG. 1 or the flat belt type. Since both of these apron types are well known, no further description thereof will be provided. The apron 46 has an inner course extending between the guide members 30 and 38 to define a bale forming chamber 48 which is expandable during bale formation. When the baler 10 is empty, the apron inner course is disposed in a wedge-shaped bale starting position 48a and the arm assembly 40 which assists in supporting the apron 46 is disposed in its forward position shown in FIG. 1. As a bale is formed in the baler 10, the bale forming chamber 48 expands while the apron inner course expands in length around the bale and the arm assembly 40 is moved toward its rearward position. When a full size bale has been formed in the baler 10, the apron inner course is disposed in the full bale position 48b and the arm assembly 40 is moved to its rearward position shown in FIG. 2. Air spring assemblies 50 are connected between the base frame 12 and the arm assembly 40 to urge the arm assembly 40 toward its forward position of FIG. 1. This maintains a predetermined amount of tension in the apron 46 during bale formation in order to control the density of bales formed in the round baler 10.

Figure 4:
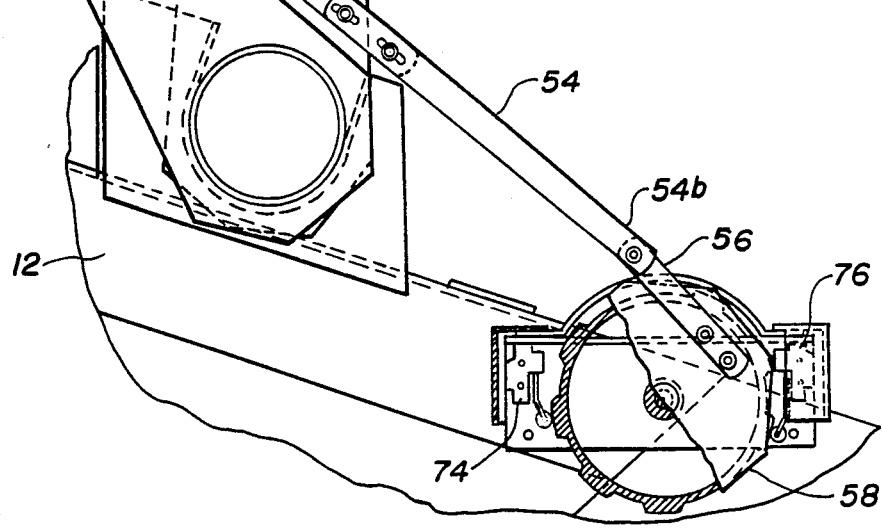

According to the present invention, bale shape monitoring apparatus 52 includes a linkage 54 pivotally connected at one end 54a to the arm assembly 40. The other end 54b of the linkage 54 is pivotally connected to a lever 56 as best seen in FIGS. 3 and 4, and the lever 56 is fixed to a plate 58 by bolts 60 shown in FIG. 5. The plate 58 is fixedly mounted on a stub shaft 62 which is journalled in a bushing 64. A bracket 66 mounted on the base frame 12 of the baler 10 by bolts 68 supports the bushing 64. A ring 70 secured to the plate 58 has a plurality of cam lobes 72a-72g formed on its outer periphery.

A pair of electrical switches 74,76 are supported at the opposite ends of the bracket 66. The switches 74,76 are preferably arranged in quadrature with rollers 78,80 carried on spring loaded arms 82,84 for engagement with the outer periphery of the ring 70 and with the cam lobes 72a-72g formed thereon. In the preferred embodiment, the switches 74,76 are normally open, and the arms 82,84 serve to close the switches 74,76 when the arms are depressed by the cam lobes 72a-72g. Alternatively, the switches 74,76 may be normally closed or one of switches 74,76 may be normally open while the other one of the switches 74,76 may be normally closed.

Figure 7:
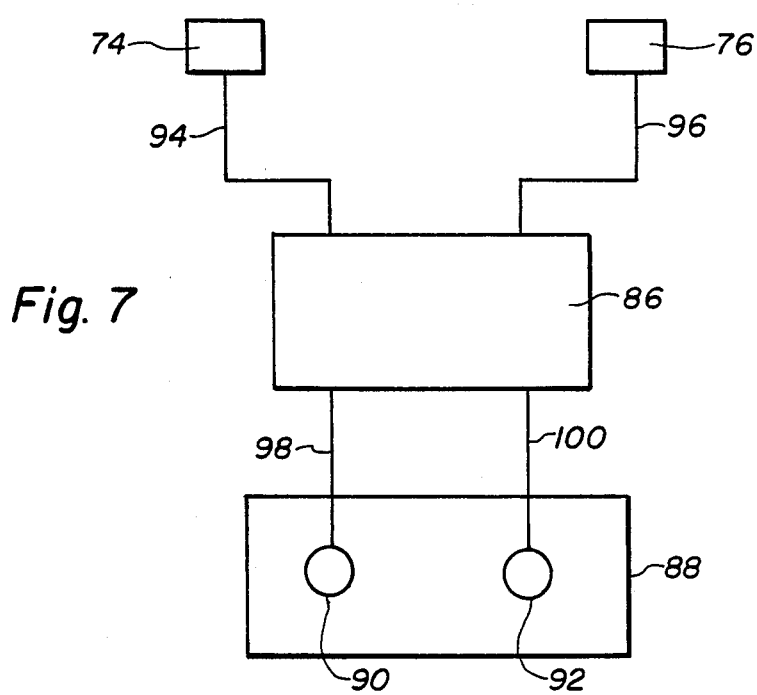
FIG. 7 is a schematic view of a system incorporating the bale shape monitoring apparatus of the present invention.

Referring to FIG. 7, a system which incorporates the bale shape monitoring apparatus 52 includes a microcomputer 86 and an operator panel 88 with left and right indicator lights 90 and 92, respectively. The switch 74 is connected to an input terminal of the microcomputer 86 by wiring 94, and the switch 76 is connected to another input terminal of the microcomputer 86 by wiring 96. The output terminals of the microcomputer 86 are connected to the indicator lights 90,92 via wiring 98,100.

When the inner course of the apron 46 is in its bale starting position 48a and the arm assembly 40 is in its forward position as shown in FIG. 1, the various parts of the bale shape monitoring apparatus 52 will be disposed in the positions shown in FIG. 3. The plate 58 and the ring 70 will be positioned so that the switches 74 and 76 are open. Activation of the system of FIG. 7 causes the left indicator light 90 to be illuminated (on) while the right indicator light 92 is extinguished (off).

Figure 8:
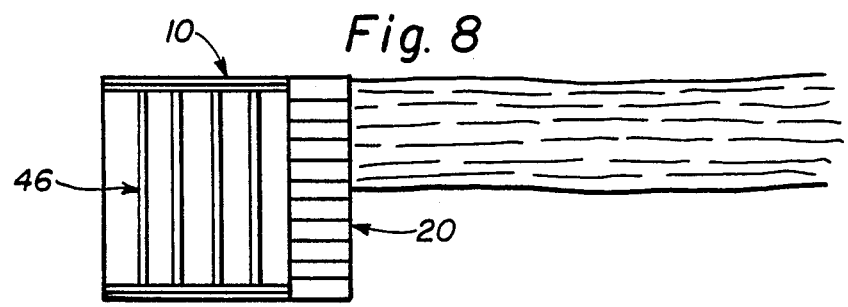
FIGS. 8 and 9 are diagrammatic plan views of a round baler during operation thereof utilizing the apparatus and method of the present invention.

The operator then starts towing the baler 10 across a field along a windrow of crop material with the pickup 20 positioned to feed crop material into the left side of the bale forming chamber 48 as illustrated in FIG. 8. As the crop material is formed into a roll bale in the bale forming chamber 48, the inner course of apron 46 expands in length and the arm assembly 40 rotates from its forward position shown in FIG. 1 toward its rearward position shown in FIG. 2. This rotation of the arm assembly 40 causes rotation of the plate 58 carrying the ring 70 with the cam lobes 72a-72g in a counterclockwise direction in FIG. 5. When the plate 58 and ring 70 are rotated far enough so that the cam lobe 72a closes the switch 74 by engaging roller 78 and depressing arm 82 while the switch 76 remains open, the left indicator light 90 is extinguished (off) and the right indicator light 92 is simultaneously illuminated (on).

Figure 9:
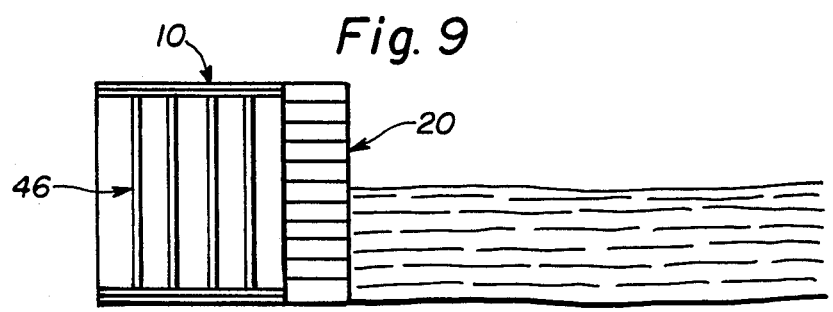

The operator then weaves the baler 10 toward the left along the windrow of crop material so that the pickup 20 is positioned to feed crop material into the right side of bale forming chamber 48 as illustrated in FIG. 9. As bale formation continues in the bale forming chamber 48, the arm assembly 40 continues to rotate toward its rearward position shown in FIG. 2 thereby causing further rotation of the plate 58 and ring 70 which is connected to the arm assembly 40 by the linkage 54 and the lever 56. This further rotation of the plate 58 results in the cam lobe 72e closing the switch 76 by engaging roller 80 and depressing arm 84 while the switch 74 remains closed by the cam lobe 72a. The left indicator light 90 is reilluminated (on) and the right indicator light 92 is extinguished (off).

Next, the operator weaves the baler 10 back toward the right in order to reposition the pickup 20 to feed crop material into the left side of the bale forming chamber 48 as shown in FIG. 8. Bale formation continues and the arm assembly 40 is rotated further causing additional counterclockwise rotation of the plate 58 and ring 70 as viewed in FIG. 5 until the switch 74 is opened while the switch 76 remains closed by the cam lobe 72e. The left indicator light 90 is extinguished (off) and the right indicator light 92 is reilluminated (on).

As bale formation continues in the bale forming chamber 48, the arm assembly 40 will continue to be rotated toward its rearward position shown in FIG. 2. This rotation of the arm assembly 40 will cause the left and right indicator lights 90 and 92, respectively, to be alternately illuminated by the bale shape monitoring apparatus 52. Consequently, the operator will be given an indication or signal when to weave the baler 10 to feed crop material into the other side of the bale forming chamber 48 of the baler 10. When the operator has ejected a bale from the baler 10 by raising and lowering the tailgate 16, the arm assembly 40 will be returned to its forward position shown in FIG. 2 by the air spring assemblies 50 and the plate 58 and ring 70 will be returned to their starting position shown in FIG. 3 via the linkage 54 and lever 56. It will be understood that proper use of the system shown in FIG. 7 results in the formation of bales which are uniformly cylindrical. Accordingly, the present invention prevents formation of poorly shaped bales while reducing operator fatigue.

The following chart lists Steps 1 to 11 of a bale shape monitoring method according to the present invention along with combinations for the switches 74,76 and the indicator lights 90,92:

| step | switch 74 | switch 76 | light 90 | light 92 |
| --- | --- | --- | --- | --- |
| 1 | open | open | on | off |
| 2 | closed by 72a | open | off | on |
| 3 | closed by 72a | closed by 72e | on | off |
| 4 | open | closed by 72e | off | on |
| 5 | open | open | on | off |
| 6 | closed by 72b | open | off | on |
| 7 | closed by 72b | closed by 72f | on | off |
| 8 | open | closed by 72f | off | on |
| 9 | open | open | on | off |
| 10 | closed by 72c | open | off | on |
| 11 | closed by 72c | closed by 72g | on | off |

The switches 74,76 are arranged to prevent a false signal from being generated by a bouncing motion of the arm assembly 40. During bale formation, the arm assembly 40 normally rotates smoothly from its forward position shown in FIG. 1 toward its rearward position shown in FIG. 2. However, under adverse conditions such as in the event of an egg-shaped bale, the arm assembly 40 may bounce back and forth during its rotational movement. To insure that a false signal is not generated when the arm assembly 40 is bouncing back and forth, the switches 74,76 must be opened and closed in the forward order of steps 1 to 11 listed in the chart above or there will be no changes in the indicator lights 90,92. For example, if the bale shape monitoring apparatus 52 has reached method step 5, indicator light 90 will remain illuminated (on) and indicator light 92 will remain extinguished (off) untill the bale shape monitoring apparatus 52 reaches step 6 of the method. Should the base shape monitoring apparatus 52 move backward from method step 5 to method step 4, for example, the indicator lights 90,92 will not change.

It will be understood that the linkage 54 is provided with adjustment slot 55 and pins 57 as shown in FIG. 4 so that the bale shape monitoring apparatus 52 may be adjusted as the apron 46 wears.

The microcomputer 86 may be programmed such that both of the indicator lights 90,92 are illuminated (on) when the apron 46 is in its bale starting position 48a. This is an indication to the operator that rapid weaving of the baler 10 should be used to start a bale. When the inner course of the apron 46 has expanded sufficiently to cause rotation of the arm assembly 40 to the point where the switch 74 is closed by cam lobe 72a while the switch 76 is open, the sequence in the chart above begins.

Having thus described the invention, what is claimed is:

1. In combination with a round baler having a bale forming apron defining a bale forming chamber which is expandable during bale formation, arm means supporting said bale forming apron and being movable as said bale forming chamber expands, first and second indicator means, bale shape monitoring means for generating a signal in said first indicator means in response to a predetermined movement of said arm means and for alternately generating a signal in said second indicator means in response to a further predetermined movement of said arm means, said bale shape monitoring means comprising:
   first and second switches arranged in quadrature and connected to said first and second indicator means; and
   single cam means connected to said arm means for selectively opening and closing said switches during the movement of said arm means in order to alternately generate the signals in said indicator means.

2. The combination of claim 1, wherein said cam means comprises a ring having a plurality of cam lobes on its outer periphery for opening and closing said switches.

3. The combination of claim 2, further comprising a plate rotatably mounted and secured to said ring, and a linkage connected between said arm means and said plate.

4. The combination of claim 3, wherein said plate is fixed to a shaft which is journalled in a bushing, and wherein said linkage is pivotally connected at one end to said arm means and at the other end to a lever which is fixed to said plate.

5. The combination of claim 4, wherein said switches have spring loaded arms which are depressed by said cam lobes to thereby close said switches.

6. In combination with a round baler having a bale forming chamber which is expandable during bale formation, first and second indicator means, bale shape monitoring means for generating a signal in said first indicator means in response to a predetermined expansion of said bale forming chamber and for alternately generating a signal in said second indicator means in response to a further predetermined expansion of said bale forming chamber, said bale shape monitoring means comprising:
   first and second switches connected to said first and second indicator means; and
   single cam means for selectively activating said switches in order to alternately generate the signals in said indicator means.

7. The combination of claim 6, wherein a microcomputer is connected between said switches and said indicator means.

8. The combination of claim 7, wherein said first and second indicator means comprise first and second indicator lights, respectively, which are alternately illuminated to provide the signals generated by said bale shape monitoring means.

9. The combination of claim 6, wherein said switches are arranged in quadrature.

10. A method for monitoring bale shape in a round baler by utilizing first and second switches connected to first and second indicator lights, said method comprising the steps of
   illuminating only said first indicator light by opening said first and second switches;
   illuminating only said second indicator light by closing said first switch while said second switch remains open;
   illuminating only said first indicator light by closing said first and second switches; and
   illuminating only said second indicator light by opening said first switch while said second switch remains closed.

* * * * *